(12) United States Patent
Zondervan et al.

(10) Patent No.: US 10,414,518 B2
(45) Date of Patent: Sep. 17, 2019

(54) VEHICLE ATTITUDE CONTROL USING MOVABLE MASS

(71) Applicant: The Aerospace Corporation, El Segundo, CA (US)

(72) Inventors: Kevin L Zondervan, Alexandria, VA (US); Jerome K Fuller, Van Nuys, CA (US)

(73) Assignee: The Aerospace Corporation, El Segundo, CA (US)

( * ) Notice: Subject to any disclaimer, the term of this patent is extended or adjusted under 35 U.S.C. 154(b) by 519 days.

(21) Appl. No.: 15/344,636

(22) Filed: Nov. 7, 2016

(65) Prior Publication Data

US 2017/0297748 A1 Oct. 19, 2017

Related U.S. Application Data

(63) Continuation-in-part of application No. 14/322,752, filed on Jul. 2, 2014, now Pat. No. 9,919,792.

(51) Int. Cl.
*B64G 1/28* (2006.01)
*B64C 17/02* (2006.01)
*B64C 15/02* (2006.01)
*B64C 19/00* (2006.01)
*F02K 1/00* (2006.01)
*F02K 9/80* (2006.01)
*F02K 9/90* (2006.01)

(52) U.S. Cl.
CPC .............. *B64G 1/28* (2013.01); *B64C 15/02* (2013.01); *B64C 17/02* (2013.01); *B64C 19/00* (2013.01); *F02K 1/002* (2013.01); *F02K 9/80* (2013.01); *F02K 9/90* (2013.01)

(58) Field of Classification Search
CPC . B64C 29/0033; B64C 29/0025; B64C 29/00; B64C 29/0066; B64C 27/52; B64C 29/0075; B64G 1/28
USPC ................................................. 244/12.5, 12.4
See application file for complete search history.

(56) References Cited

U.S. PATENT DOCUMENTS 3,258,223 A 6/1966 A
3,318,532 A 5/1967 Gaubatz
(Continued)

OTHER PUBLICATIONS

Menon et al. "Finite-Horizon Robust Integrated Guidance-Control of a Moving-Mass Actuated Kinetic Warhead", 2006.*
(Continued)

*Primary Examiner* — Assres H Woldemaryam
(74) *Attorney, Agent, or Firm* — LeonardPatel PC

(57) ABSTRACT

Attitude of a vehicle may be controlled using movable mass. The movable mass may move inside a vehicle or its outline, outside of the vehicle or its outline, inside-to-outside and/or outside-to-inside of the vehicle or its outline, or any combination thereof. The movable mass may be a solid, liquid, and/or gas. When the center-of-mass of the vehicle is moved relative to the line-of-action of applied forces such as thrust, drag, or lift, a torque can be generated for attitude control or for other purposes as a matter of design choice. In the case of external movable masses that extend from the vehicle or its outline, when operating in endoatmospheric flight, or general travel through a fluid, aerodynamic forces from the atmosphere or general fluid forces may further be leveraged to control the attitude of the vehicle (e.g., aerodynamic flaps).

15 Claims, 14 Drawing Sheets

(56) References Cited

U.S. PATENT DOCUMENTS

| | | | |
|---|---|---|---|
| 3,606,210 | A | 9/1971 | E |
| 3,730,460 | A | 5/1973 | Mederer |
| 3,749,334 | A * | 7/1973 | McCorkle, Jr. ............ F41G 7/36 |
| | | | 244/3.22 |
| 3,785,595 | A | 1/1974 | Fischell |
| 4,274,610 | A | 6/1981 | Bastian |
| 4,408,740 | A | 10/1983 | Kleber |
| 4,684,084 | A * | 8/1987 | Fuldner ..................... B64G 1/24 |
| | | | 136/292 |
| 4,898,343 | A | 2/1990 | Kamo |
| 5,154,050 | A | 10/1992 | Herup et al. |
| 6,082,670 | A | 7/2000 | Chapman |
| 6,318,668 | B1 | 11/2001 | Ulanoski et al. |
| 7,819,362 | B2 * | 10/2010 | Hale ......................... B64D 1/16 |
| | | | 137/899.2 |
| 2006/0006759 | A1 | 1/2006 | Matsuki |
| 2008/0029646 | A1 * | 2/2008 | Von Mohos ............. B64D 1/16 |
| | | | 244/129.1 |
| 2008/0127775 | A1 | 6/2008 | Stoner |
| 2008/0302183 | A1 | 12/2008 | Peng et al. |
| 2011/0056891 | A1 * | 3/2011 | Greene, III ............... C02F 1/76 |
| | | | 210/749 |
| 2011/0184591 | A1 | 7/2011 | Kordt |
| 2012/0298789 | A1 | 11/2012 | Oz |
| 2014/0166815 | A1 | 6/2014 | Dula |
| 2014/0263844 | A1 * | 9/2014 | Cook, Jr. ................ B64G 1/222 |
| | | | 244/164 |
| 2015/0284064 | A1 * | 10/2015 | Dufour ..................... B63G 8/18 |
| | | | 114/332 |

OTHER PUBLICATIONS

Boynton, "How Mass Properties Affect Satellite Attitude Control", 2008.*
Wired "Take a peek inside the 747-8 test plane", 2010.*
Sasha S. Vaddi, "Moving Mass Actuated Missile Control Using Convex Optimization Techniques", 2006.*
"Evolved SeaSparrow Missile Jet Vane Control System Prototype Hardware Development," Andrew B. Facciano, Karleen G. Seybold, Teri L. Westberry-Kutz, and Dale O. Widmer, Journal of Spacecraft and Rockets, vol. 39, No. 4, Jul.-Aug. 2002.
"Finite-Horizon Robust Integrated Guidance-Control of a Moving-Mass Actuated Kinetic Warhead," P. K. Menon, S. S. Vaddi, and Ernest J. Ohlmeyer, presented at the 2006 AIAA Guidance, Navigation, and Control Conference, Aug. 21-24, Keystone, CO.
"Integrated Guidance and Control of Moving-Mass Actuated Kinetic Warheads," P. K. Menon, G. D. Sweriduk, E. J. Ohlmeyer, and D. S. Malyevac, Journal of Guidance, Control, and Dynamics, vol. 27, No. 1, p. p. 118-126, Jan.-Feb. 2004.
"Jet Vane Control System Prototype Hardware Development for the Evolved SeaSparrow Missile," Andrew B. Facciano, Karleen G. Seybold, Teri L. Westberry-Kutz, andDale O. Widmer, Raytheon Missile Systems Technical Report (1999).
"Moving Mass Actuated Reentry Vehicle Control Based on Trajectory Linearization," Xiao-Long Su, Jian-Qiao Yu, Ya-Fei Wang, and Lin-lin Wang, Int'l J. of Aeronautical & Space Sci. 14(3), 247-255 (2013).
"Numerical Sdre Approach for Missile Integrated Guidance—Control," S. S. Vaddi, P. K. Menon, and E. J. Ohlmeyer, http://www.optisyn.com/research/publications/2009/SDRE_paper_igcd.pdf (2009).
"Tactical Missile Design," E.L. Fleeman, p.p. 36-53, AIAA Education Series, First Edition (2001).
"Tactical Missile Design," E.L. Fleeman, p. p. 66-67, AIAA Education Series, Second Edition (2006).
Assres H. Woldemaryam, "Non-Final Office Action" dated Oct. 5, 2015 for U.S. Appl. No. 14/322,752.
Assres H. Woldemaryam, "Non-Final Office Action", dated Jul. 21, 2016 for U.S. Appl. No. 14/322,752.
Notice of Allowance issued in U.S. Appl. No. 14/322,752 dated Mar. 30, 2016.
ZonderVan et al. "CubeSat Solid Rocket Motor Propulsion System Providing Delta Vs Greater than 500 m-s.pdf", 28th Annual AIAA/USU Conference on Small Satellites.
Christopher P. Rahaim et al., "Jet Vane Thrust Vector Control—A Design Effort," American Institute of Aeronautics and Astronautics (AIAA) Paper 96/2904 (Jul. 1996).
Thomas L. Moore, "Solid Rockets," Aerospace America, Propulsion and Energy, pp. 50-51 (Dec. 2003).
Ahn T. Young, "Attitude Dynamics and Control of Spacecraft Using Shifting Mass Distribution", 2012.
Assres H. Woldemaryam; "Final Office Action", dated Feb. 9, 2017, for U.S. Appl. No. 14/322,752.
Assres H. Woldemaryam, Final Office Action, dated Aug. 7, 2017, U.S. Appl. No. 14/322,752.
M. Ryan Schefermeyer, "Aerodynamic Thrust Vectoring for Attitude Control of a Vertically Thrusting Jet Engine", Utah State University, All Graduate Theses and Dissertations, 2011.
Notice of Allowance issued in U.S. Appl. No. 14/322,752 dated Nov. 30, 2017.
Assres H. Woldemaryam, "Non-Final Office Action", dated Apr. 21, 2017 for U.S. Appl. No. 14/322,752.
Jacob Bean, "Small Satellite Attitude Control Using Linear Moving Mass Actuators", 2008.
NASA, "X-31 Enhanced Fighter Maneuverability Demostrator", Dryden Flight Research Center.

* cited by examiner

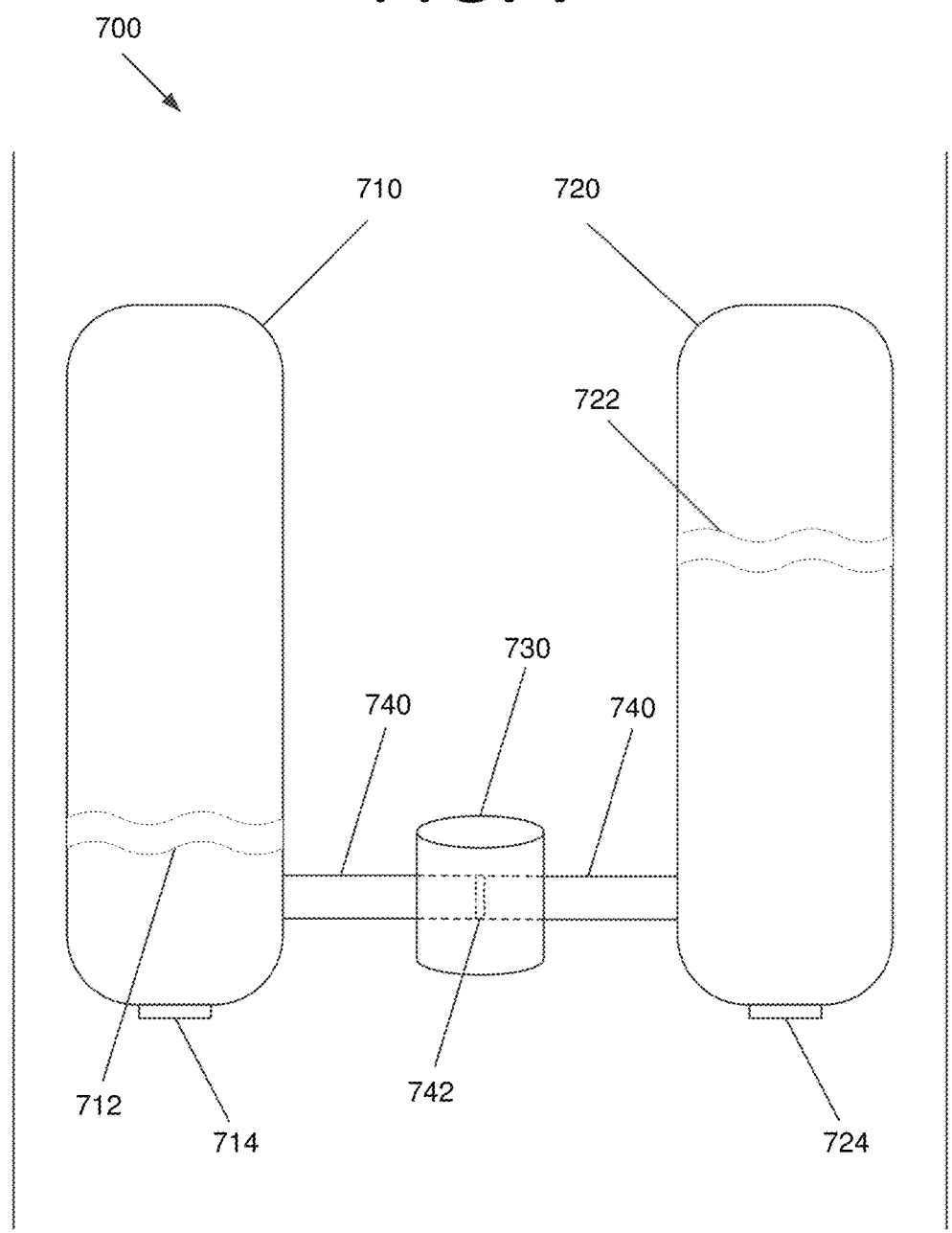

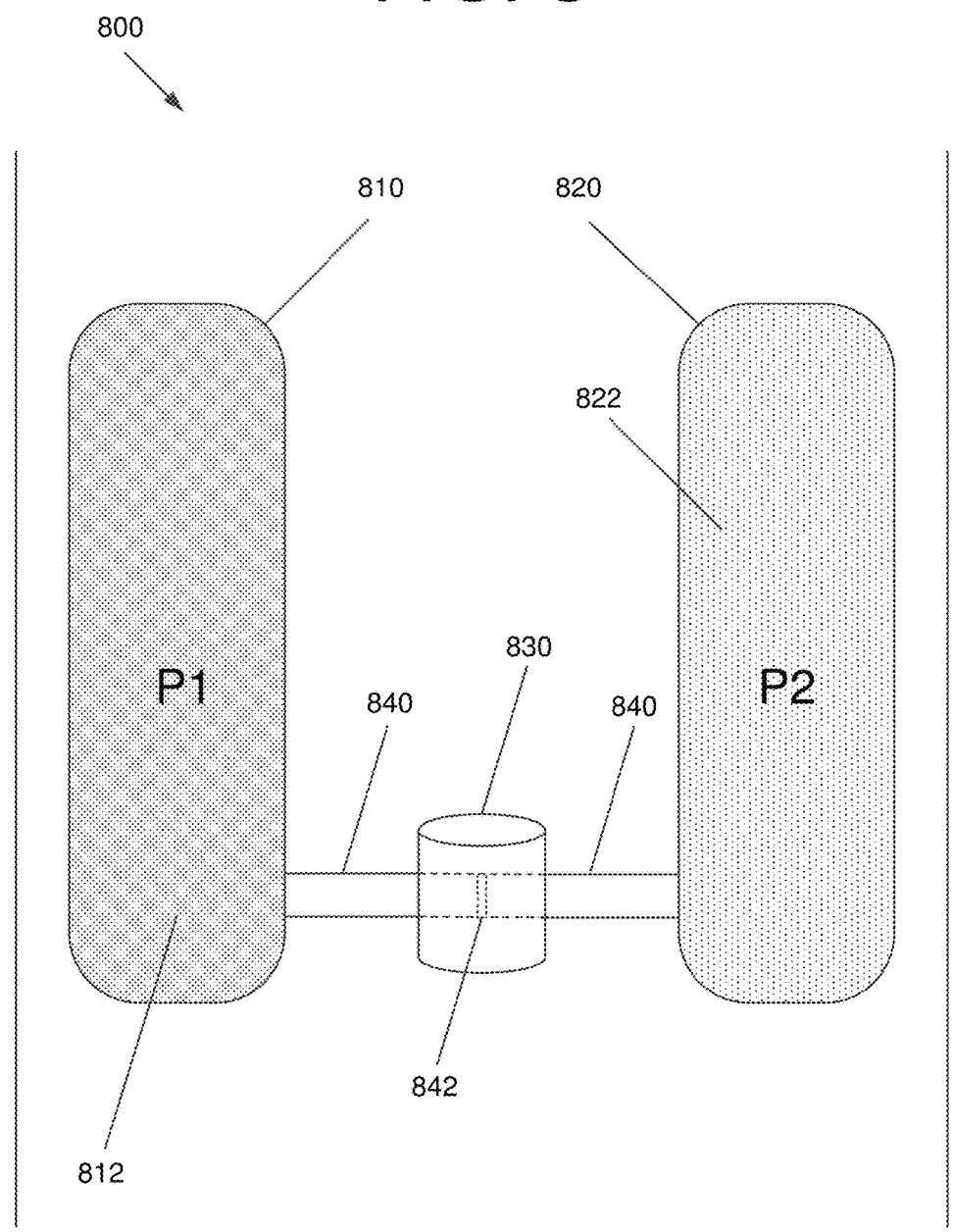

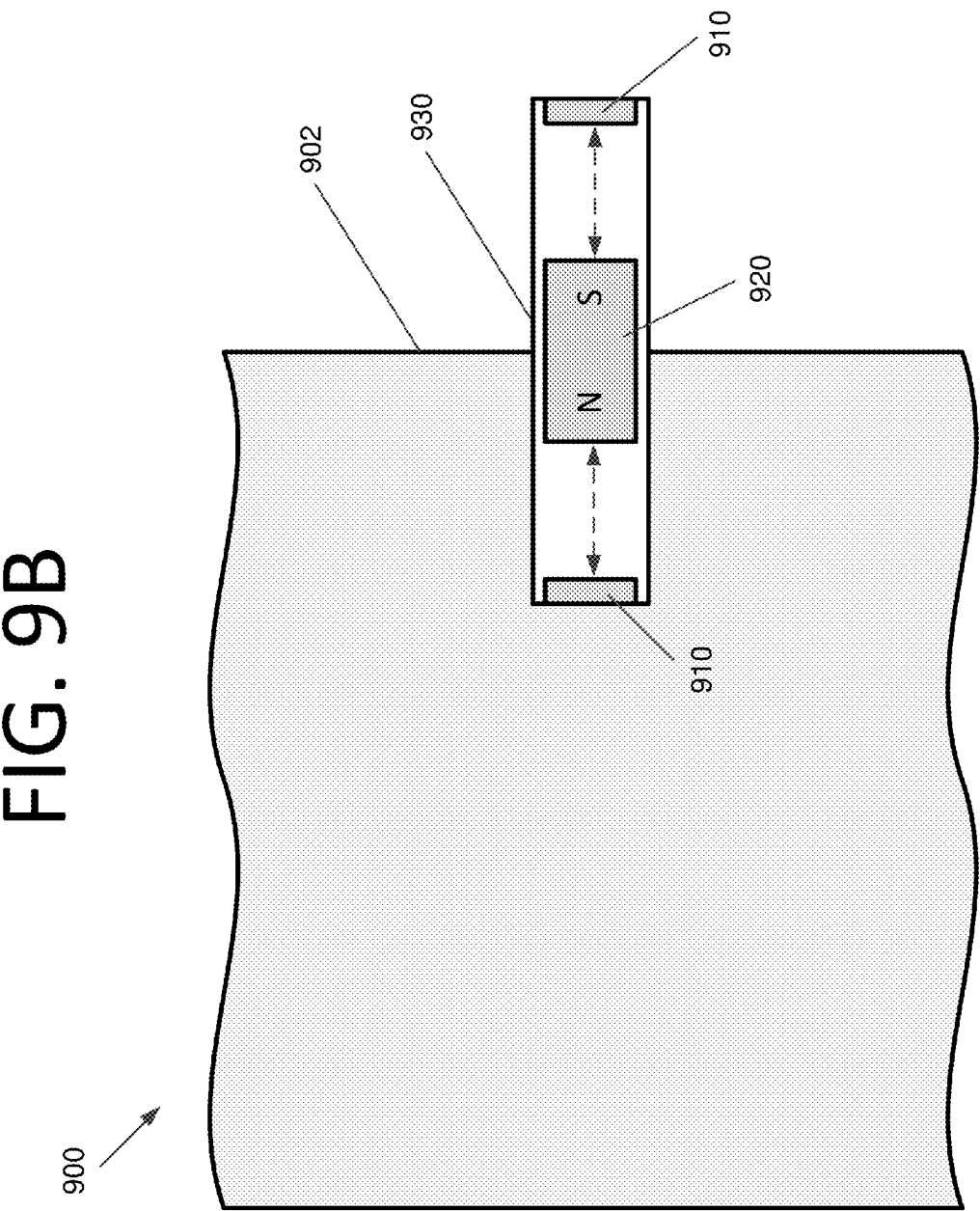

VEHICLE ATTITUDE CONTROL USING MOVABLE MASS

CROSS REFERENCE TO RELATED APPLICATION

This application is a continuation-in-part of U.S. patent application Ser. No. 14/322,752 filed Jul. 2, 2014. The subject matter of this earlier filed application is hereby incorporated by reference in its entirety.

FIELD

The present invention generally pertains to vehicle flight control, and more specifically, to vehicle attitude control using movable mass.

BACKGROUND

Conventional approaches to steering a rocket-propelled vehicle employ an attitude control system (ACS) for directing the thrust of the rocket engine. Thrust vector control (TVC) approaches generate torque needed for attitude control and may be employed in both endoatmospheric and exoatmospheric vehicles in some cases. When steering a rocket-propelled vehicle, there is an intimate connection between the thrust of the main rocket motor and the needed torque to maintain attitude control. High performance rocket motors typically have thrust misalignment errors of between 0.15° and 0.25°. TVC systems can compensate for thrust misalignment by redirecting the thrust by an appropriate angle relative to the vehicle. The needed torque is approximately the thrust times the distance between the nozzle of the rocket motor and the center-of-mass of the vehicle times the misalignment error expressed in radians Conventionally, TVC for rocket-propelled vehicles is performed using jet vanes, a gimbaled nozzle, a gimbaled engine, multiple engines with variable thrust, or a vectoring exhaust nozzle. Also, low thrust spacecraft may make use of other torque generation techniques, such as reaction wheels, control moment gyros, and magnetic torque coils.

Movable mass has also been considered for generating torque and controlling the attitude of a vehicle when external forces (e.g., thrust and aerodynamic forces) are applied to the vehicle. As used herein, movable mass denotes one or more volumes of mass that can be moved to sufficiently alter the location of the center-of-mass of a vehicle for flight control purposes. "Movable mass" and "movable masses" are used interchangeably. Movable masses have been analyzed and computer simulated for kinetic kill vehicles. However, such movable masses have always been internal to these vehicles, and furthermore, they have not been applied specifically to mitigating thrust misalignments. Also, TVC systems and movable mass systems have not been applied to small rocket-propelled vehicles, e.g., rocket motors with a mass of a few kilograms and nozzle dimensions of a few centimeters. Accordingly, an alternative ACS that may be configured for such vehicles may be beneficial.

SUMMARY

Certain embodiments of the present invention may be implemented and provide solutions to the problems and needs in the art that have not yet been fully solved by conventional vehicle ACSs and/or steering systems. For example, some embodiments of the present invention use movable masses to control the attitude (i.e., pitch, yaw, and/or roll) of a thrusting vehicle. Certain embodiments of the present invention use movable mass to control the pitch/yaw, pitch/yaw rate, or both, of a vehicle subjected only to a thrust force.

In an embodiment, an apparatus includes one or more movable masses configured to sufficiently change a center-of-mass of the apparatus so as to effect flight control. At least one of the movable masses is outside the apparatus or its outline, movable from inside the apparatus or its outline to at least partially outside the apparatus or its outline and vice versa, or any combination thereof.

In another embodiment, an apparatus includes a liquid or gaseous movable mass. The apparatus also includes a first tank and a second tank configured to store the movable mass. The apparatus further includes a pipe connecting the first tank to the second tank and a pump configured to pump the one or more movable masses back and forth between the first tank and the second tank.

In yet another embodiment, an apparatus includes one or more movable masses configured to move a center-of-mass of the apparatus and a computing system configured to calculate torque for attitude and/or attitude rate control of the apparatus. The computing system is configured to calculate a nulling torque to compensate for thrust misalignment and to modify the center-of-mass of the apparatus by moving at least one of the one or more movable masses to achieve the torque and/or the nulling torque.

In still another embodiment, a computer-implemented method includes calculating, by a computing system, a torque to compensate for thrust misalignment, perform attitude control, and/or perform attitude rate control. The computer-implemented method also includes performing nullification of a thrust misalignment, performing attitude control, and/or performing attitude rate control, by the computing system, by moving at least one movable mass to alter a center-of-mass of the apparatus.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a side cutaway view illustrating a rocket-propelled vehicle where torque is controlled by pumping fluid internally within the vehicle as a movable mass, according to an embodiment of the present invention.

FIG. 8 is a side cutaway view illustrating a rocket-propelled vehicle where torque is controlled by pumping pressurized gas internally within the vehicle as a movable mass, according to an embodiment of the present invention.

FIG. 9B is a side cutaway view illustrating the movable mass suspended by electromagnetic fields movable from inside to outside of the vehicle, and vice versa, according to an embodiment of the present invention.

DETAILED DESCRIPTION OF THE EMBODIMENTS

Figure 1:
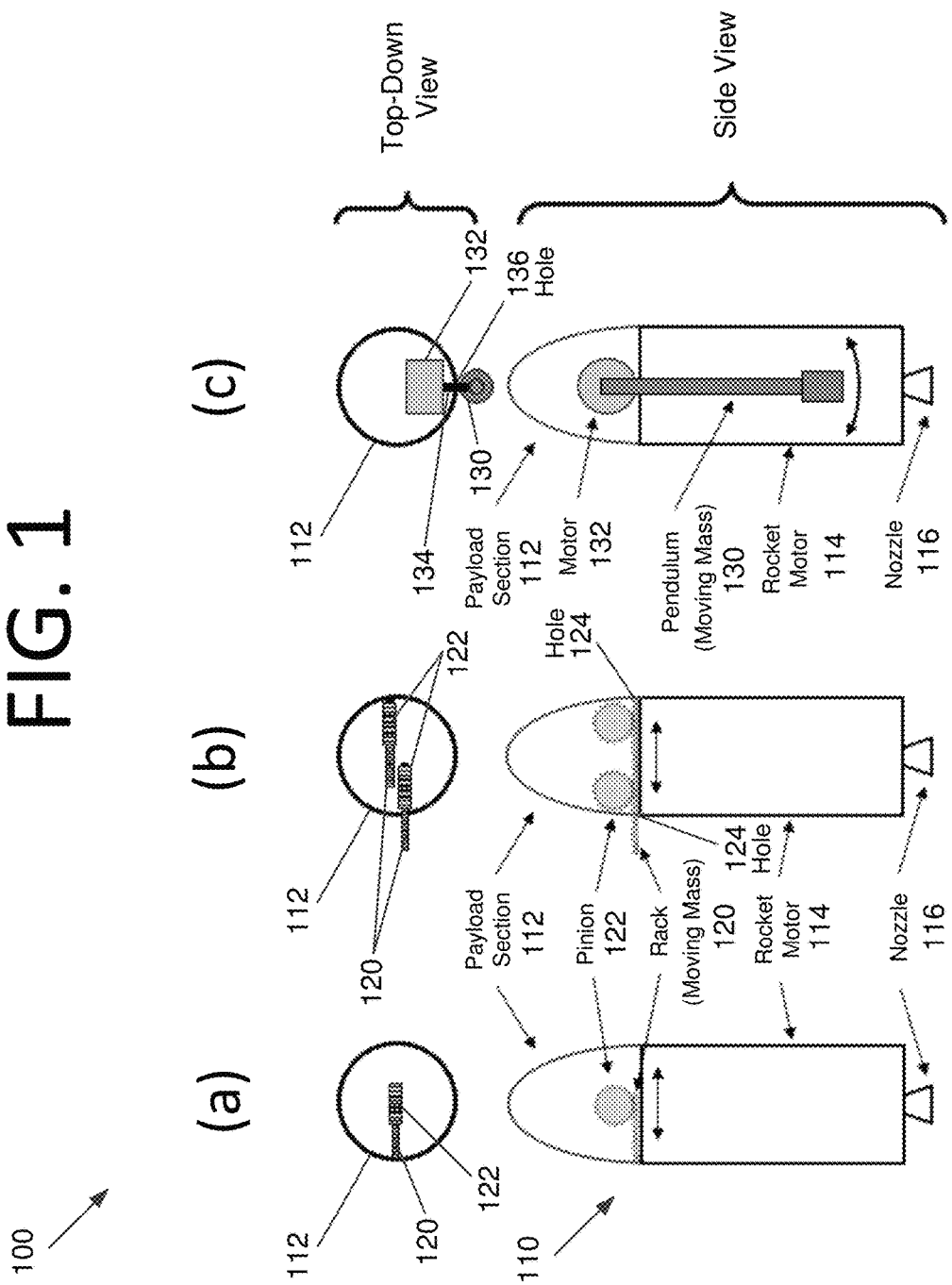
FIG. 1 illustrates a rocket-propelled vehicle where torque is controlled via (a) internal, (b) internal and external, and (c) external movable masses, according to an embodiment of the present invention.

Some embodiments of the present invention control attitude of a vehicle using movable masses. In some embodiments, an ACS may be part of a flight control system for the vehicle. However, what control system moves the movable masses is a matter of design choice, and any computing system or mechanical system capable of achieving such movement and control is within the scope of this disclosure. Furthermore, the vehicles discussed herein may be autonomous, piloted, human controlled from the ground, or any combination thereof.

The engine of the vehicle in some embodiments may be a rocket engine (solid, liquid, or hybrid), an ion thruster, an arcjet, a Hall effect thruster, a turbine engine or other Brayton cycle heat engine, an engine expelling a liquid, or any other engine producing thrust via exhaust flow as a matter of design choice. In certain embodiments, more responsive performance may be achieved in systems with a larger exhaust flow, such as rocket engines and jet engines. In some embodiments, movable masses may be used for vehicles that include, but are not limited to, fireworks, rockets, aircraft, surface vehicles, hovercraft, and underwater vehicles, among others.

Movable mass is any mass of a vehicle that can be moved to alter the center-of-mass of the vehicle in order to control flight. The movable mass may move inside a main body of a vehicle (if it has one), outside of the main body of the vehicle, inside-to-outside and/or outside-to-inside of the main body of the vehicle, or any combination thereof. In cases where the vehicle has an external surface or skin (e.g., a fuselage), such as is typical with launch vehicles, the "inside" would be deemed to be within, and internal to, the external surface or skin and the "outside" would be deemed to be at least partially outside of, and external to, the external surface or skin. However, in embodiments where the vehicle has only a partial external surface or skin, or no external surface or skin at all, such as is typically the case with truss structures, or external surfaces having a skin with holes, "inside" is defined as within the outline of the vehicle and "outside" is defined as at least partially outside of the outline of the vehicle. This concept is explained in more detail with respect to FIG. 10.

The movable mass may be a solid, liquid, and/or gas. When the center-of-mass of the vehicle is moved relative to the line-of-action of applied forces such as thrust, drag, or lift, a torque can be generated for attitude control or for other purposes as a matter of design choice. In the case of external movable masses that extend from the vehicle, when operating in endoatmospheric flight, or general travel through a fluid, aerodynamic forces from the atmosphere or general fluid forces may further be leveraged to control the attitude of the vehicle (e.g., aerodynamic flaps). Movable mass is not limited to conventional flying vehicles, but may be used for any vehicle traveling through a fluid or empty space, or traveling on a surface where two-dimensional attitude changes may occur, with an applied external force, whether self-propelled or not. Such vehicles may include, but are not limited to, fireworks, ballistic projectiles (e.g., bullets and artillery), bombs, gliders, multiple independently retargetable reentry vehicles (MIRVs), satellites, hovercraft, and underwater vehicles, among others.

In order to more clearly explain some embodiments of the present invention, a vehicle with a single engine and a single exhaust nozzle is shown herein. However, a person of ordinary skill in the art will readily understand and appreciate how some embodiments can be applied to a vehicle with multiple engines and/or multiple nozzles. Roll, as used herein, is a rotation about the axis of symmetry of the exhaust nozzle, and pitch and yaw are rotations orthogonal to this axis. The axis of rotation of pitch is orthogonal to that of yaw. Those of ordinary skill in the art will readily appreciate how these rotations can be defined in other ways.

Some embodiments of the present invention control the attitude of a vehicle using movable masses. The movable mass may be a solid, a liquid, a gas, or any combination thereof. As shown in FIGS. 1-10, the movable mass may move inside the outline of a vehicle, outside the outline of the vehicle, inside-to-outside and/or outside-to-inside of the outline of the vehicle (e.g., passing through holes as needed), or any combination thereof. A movable mass system takes advantage of all applied forces on a vehicle, e.g., thrust, lift, and drag, and can therefore be called a force vector control system (c.f., a thrust vector control system). The movable mass force vector control system may be part of a vehicle ACS.

The movable mass ACS may be used to null engine thrust misalignments and to steer the vehicle in endoatmospheric flight, exoatmospheric flight, travel through a fluid, travel on a surface when attitude changes are not constrained, or any combination thereof. When the lines of action of the thrust and aerodynamic or other applied forces acting on the vehicle do not pass through the center-of-mass of the vehicle, a torque is created about the center-of-mass. This causes the attitude of the vehicle to change in accordance with the torque when the vehicle is not constrained. Thus, by moving mass in the vehicle in an appropriate way, the center-of-mass can be moved relative to the lines of action of the forces, and a torque can be generated for attitude and/or attitude rate control. As the attitude of the vehicle changes, the thrust direction also changes, as typically does the magnitude of any lift and drag forces, allowing the vehicle to be steered. The concept of lines of action is discussed in further detail with respect to FIG. 13 below.

FIG. 1 illustrates (a) internal, (b) internal and external, and (c) external movable mass configurations 100, according to an embodiment of the present invention. A vehicle 110 includes a payload section 112, a rocket motor 114, and a nozzle 116. In these embodiments, the movable mass mechanisms are located in payload section 112 of vehicle 110. However, one of ordinary skill in the art will appreciate that the movable mass mechanisms may be in other locations of vehicle 110 without deviating from the scope of the invention.

In internal (i.e., inside) configuration (a), a rack 120 is moved by rotation of a pinion 122. Similarly, in internal (i.e., inside) and external (i.e., outside) configuration (b), a pair of pinions 122 drive racks 110 through holes 124 in the exterior of vehicle 110. In these embodiments, racks 120 serve as the movable mass.

In external (i.e., outside) configuration (c), a pendulum 130 serves as the movable mass. Pendulum 130 is moved via a motor 132. A shaft 134 of motor 132 passes through a hole 136 in the exterior surface of vehicle 110. Movement of pendulum 130 causes sufficient changes to the center-of-mass of vehicle 110 to perform flight control operations.

Figure 2:
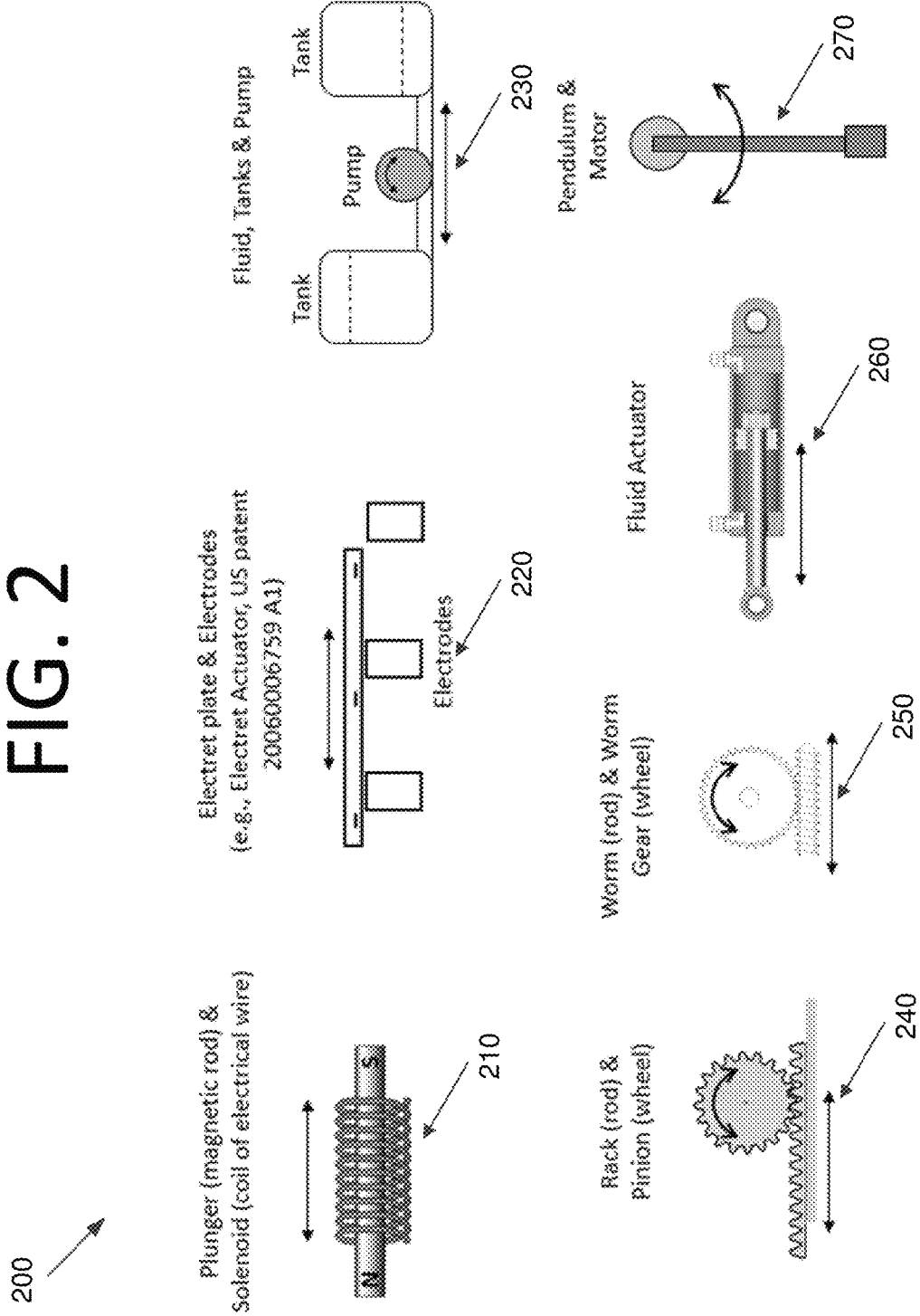
FIG. 2 illustrates some of the techniques available to move a portion of the mass of a rocket-propelled vehicle, according to an embodiment of the present invention.

As shown in techniques 200 of FIG. 2, mass can be moved in a variety of ways—solenoids, motors, magnetic fields, fluid flow, etc. In the case where magnetic or other force fields are used, movable mass need not be physically attached to the vehicle at all, but instead can be "suspended" using the magnetic or other fields (see, e.g., the Electret Actuator in U.S. patent application publication number 2006/0006759 A1). Some of these approaches are shown in FIG. 2. For instance, a plunger and solenoid 210, an electret plate and electrodes 220, fluid, tanks, and a pump 230, a rack and pinion 240, a worm and worm gear 250, a fluid actuator 260, and a pendulum and motor 270 may all be used to move mass The quantity, size, distribution, range of motion, speed, and acceleration of the movable mass may be tailored to a specific application. For some applications, the mass, size, and power needs of a movable mass system may be lower than those of a more traditional ACS. This may make a movable mass system particularly suitable for use in small vehicles.

Figure 3B:
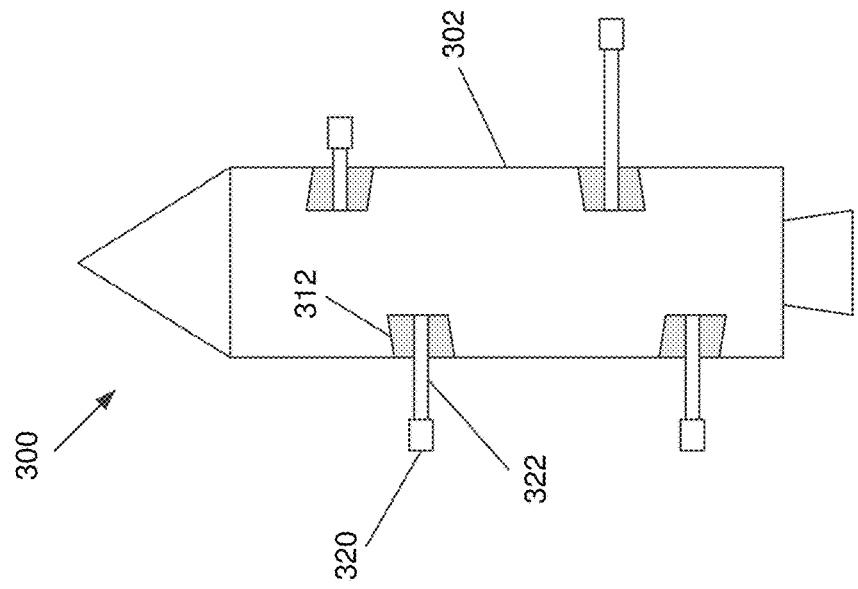
FIG. 3B is a side view illustrating the rocket-propelled vehicle with mass doors open and movable masses extended, according to an embodiment of the present invention.
Figure 3A:
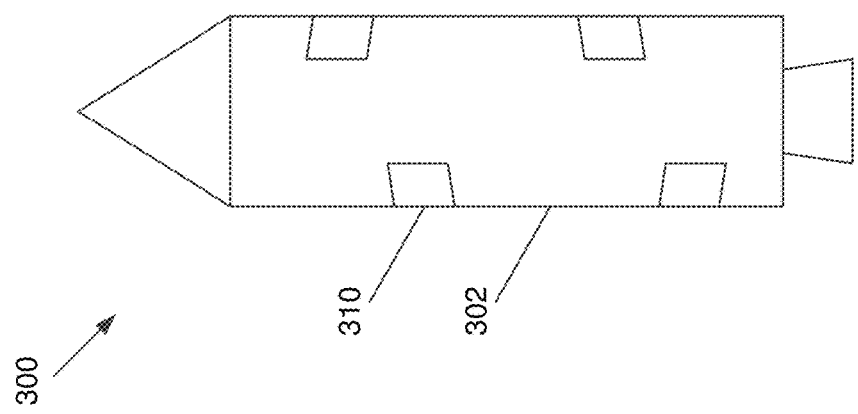
FIG. 3A is a side view illustrating a rocket-propelled vehicle with mass doors closed, according to an embodiment of the present invention.

FIGS. 3A and 3B illustrate a rocket-propelled vehicle 300 with movable mass doors 310 closed and open, respectively. A body 302 of rocket-propelled vehicle 300 houses internal components. When movable mass doors 310 are opened, respective end masses 320 may be extended outwards from body 302 via rods 322 through respective openings 312 formed by opening respective movable mass doors 310. Naturally, rods 322 have mass themselves. Therefore, end masses 320 and rods 322 collectively constitute movable masses for the purposes of performing flight control. The amount of torque that is generated may be increased during operation in the presence of the atmosphere since drag will result from extending the rods 322/end masses 320. In some embodiments, end masses 320 may not be present at all, and instead, rod 322 may be used to perform flight control. It should be noted that the position, size, configuration, and number of end masses, doors, and rods may be altered without deviating from the scope of the invention, and FIGS. 3A and 3B are provided for the purpose of illustrating the general concept. In fact, doors may not be used at all for some applications, e.g., certain space vehicles.

Figure 4:
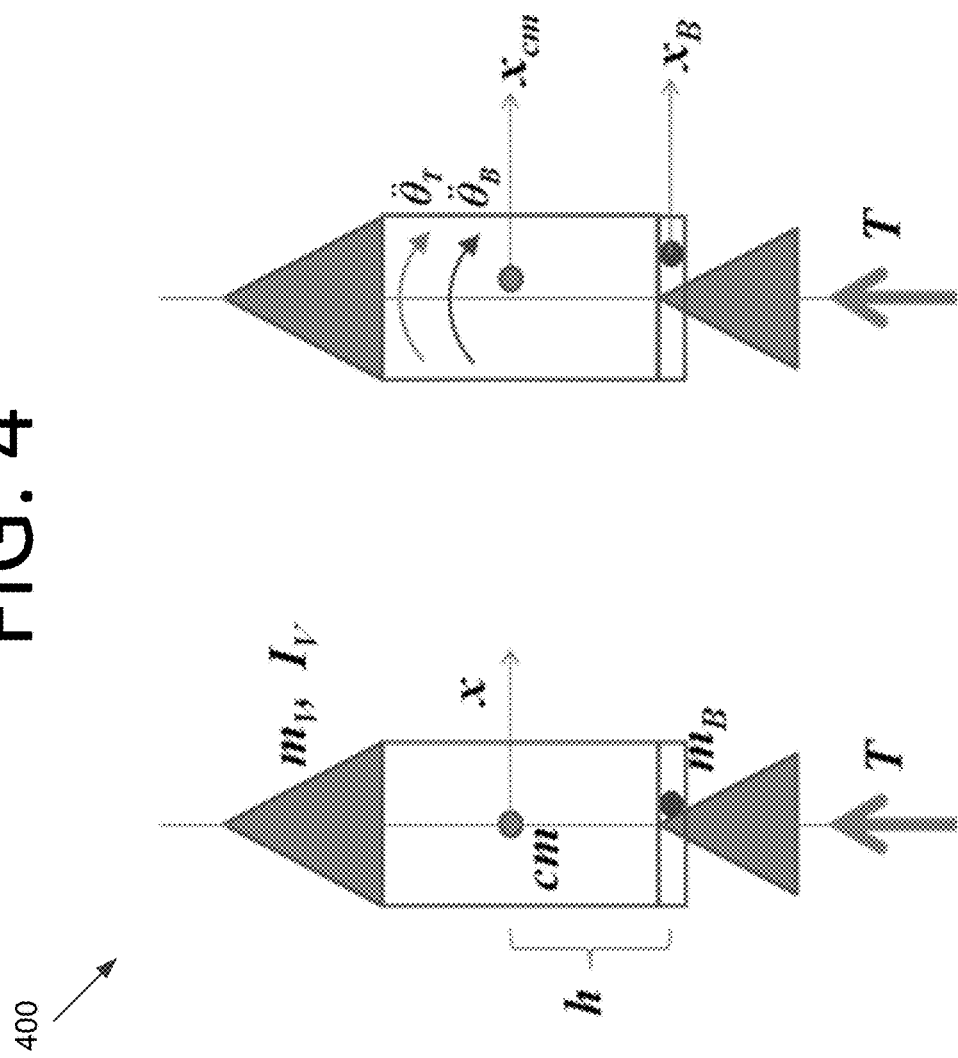
FIG. 4 is a side cutaway view illustrating a rocket-propelled vehicle where torque is controlled via internal movable masses, according to an embodiment of the present invention.

FIG. 4 illustrates a rocket-propelled vehicle 400 where torque is controlled via internal movable masses, according to an embodiment of the present invention. In this example, only two dimensions and one force (thrust) are considered for simplicity. The left image shows the case where the thrust line-of-action is perfectly aligned with the longitudinal axis or axis of symmetry of the vehicle and passes through the center-of-mass. The thrust is denoted T, the mass of vehicle 400 $m_V$, the relevant moment of inertia $I_V$, the mass of the "movable mass" $m_B$, which is typically less than $m_V$, and the distance from the center-of-mass to the line-of-motion of the movable mass h. The angle θ corresponds to pitch or yaw. For simplicity, the line-of-motion of $m_B$ is orthogonal to the thrust line-of-action. The coordinate in the line-of-motion direction is x. As the ACS moves $m_B$ an amount $x_B$, the center-of-mass moves an amount $x_{cm}$. Two torques are created—one due to the thrust and its lever arm $x_{cm}$, which corresponds to an angular acceleration $\ddot{\theta}_T$, and another due to the reaction force of the vehicle caused by the acceleration of the movable mass $x_B$, and its lever arm h, which corresponds to an angular acceleration $\ddot{\theta}_B$. The sum of these two angular accelerations is the net angular acceleration of vehicle 400. Once the movable mass stops accelerating, only $\ddot{\theta}_T$ remains. The following equations provide these angular accelerations:

$$x_{cm} = \left(\frac{m_B}{m_V + m_B}\right) x_B$$

$$\ddot{\theta}_T = \frac{T x_{cm}}{I_V + m_B x_B^2}$$

$$\ddot{\theta}_B = \frac{m_B \ddot{x}_B h}{I_V + m_B x_B^2}$$

$$\ddot{\theta}_{NET} = \ddot{\theta}_T + \ddot{\theta}_B$$

The right image can be considered the case of a thrust misalignment ($m_B$ is initially not moving relative to vehicle 400 in this case). To nullify the torque due to this thrust misalignment, $m_B$ is moved so that the center-of-mass intersects the line-of-action of the thrust, as shown in the left image. The location and path of $m_B$ shown in FIG. 4 is for purposes of illustration only. The location and path of the movable mass can be anywhere in some embodiments (i.e., inside, outside, and/or inside and outside of the vehicle), provided it is attached or otherwise affixed (e.g., via magnetic fields) to the vehicle and changes the center-of-mass location of the vehicle. The quantity of mass that is moved, the path over which the mass moves, and the speed and acceleration with which the mass is moved depends on the requirements of the ACS and the desired attitude correction. Roll can also be controlled in some embodiments if a force that is not parallel to the roll axis is also acting on the vehicle, such as lift or drag force in endoatmospheric flight, or any other suitable force.

A significant feature of some embodiments is their scalability with the mass and size of the vehicle. Generally speaking, the mission requirements of missiles, rockets, spacecraft, and other similar vehicles include kinematic parameters such as translational and angular accelerations. As the mass of a vehicle is reduced, the forces and torques required to achieve these accelerations are also reduced. The quantity of movable mass required to shift the center-ofmass and achieve a specified level of attitude control authority is also reduced proportionately. Since there are a wide range of miniature actuators available for moving mass, the movable mass ACS of some embodiments can be very small and may be appropriate for very small vehicles. This is not necessarily the case for conventional ACSs, especially those that require TVC systems and thrusters.

Figure 5:
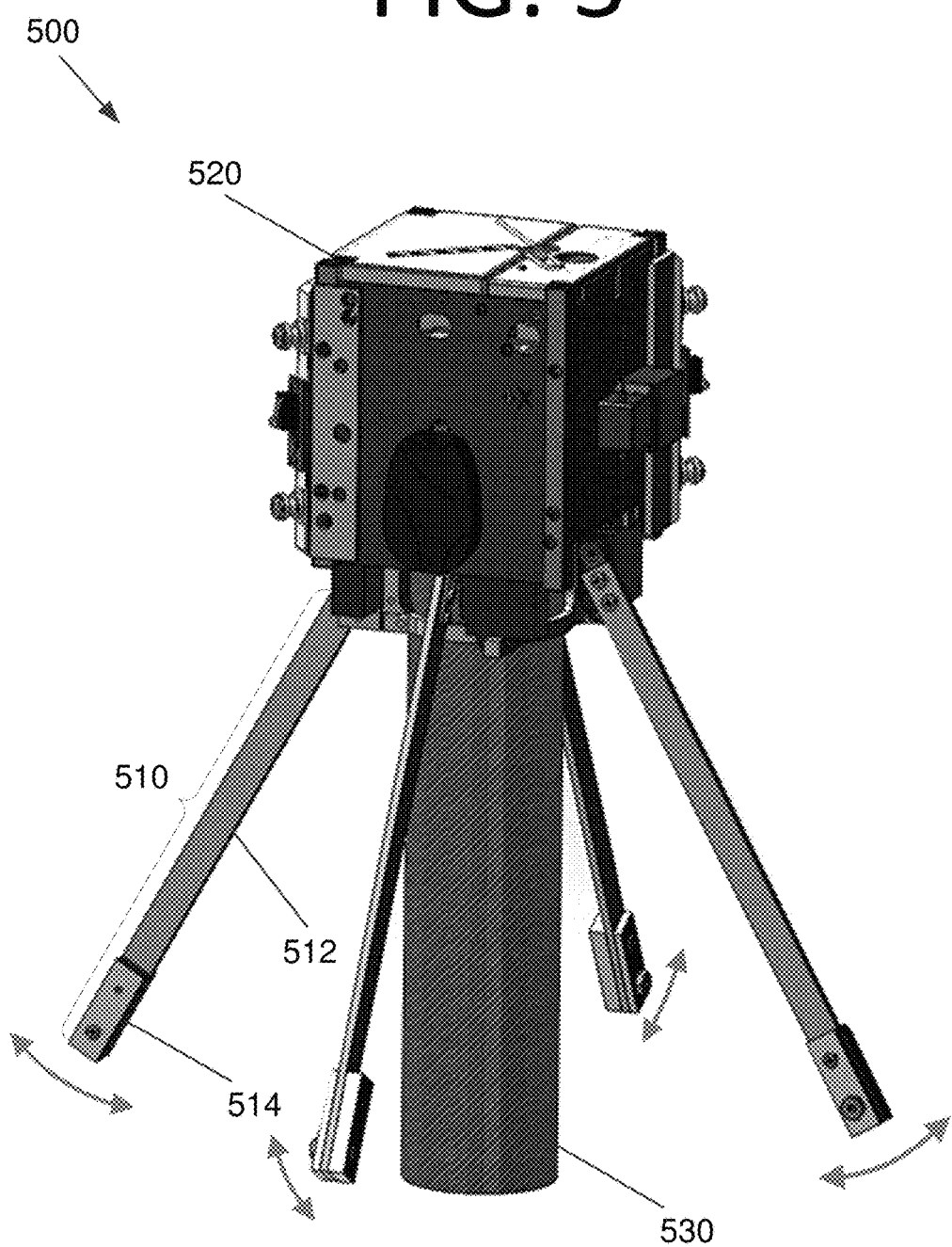
FIG. 5 is a perspective view illustrating a rocket propelled vehicle with an external movable mass pitch/yaw ACS, according to an embodiment of the present invention.

Embodiments of the movable mass ACS may use internal movable masses, external movable masses, internal-to-external movable masses, external-to-internal movable masses, or any combination thereof. As such, a large number of embodiments are possible. FIG. 5 is a perspective view illustrating a rocket propelled vehicle 500 with an external movable mass pitch/yaw ACS, according to an embodiment of the present invention. Vehicle 500 is a 2 kg rocket-propelled vehicle in this embodiments that uses four external movable masses 510 for thrust misalignment mitigation and attitude control of vehicle 500. The mass of vehicle 500 is evenly split between a 1 kg cubical payload 520 that includes the sensors, computing system, and battery of a movable mass pitch/yaw ACS (not shown) and a 1 kg cylindrical solid rocket motor 530 ( 50 N×30 sec) beneath it. The mass of each arm 512 with its end mass 514 is 3.7% of the total mass of vehicle 500 in this embodiment. The mass of the four external movable masses 510 and their actuators is about 18% of the total mass of vehicle 500. However, other mass percentages, masses, and numbers of arms may be used in other embodiments. This system is capable of handling up to 1.7° of thrust misalignment (about 10 times that of tactical solid rocket motors).

Rocket-propelled vehicle 500 was fabricated and subjected to a test flight on Jun. 28, 2012. Rocket motor 530 burned for seven seconds during this flight. The movable mass pitch/yaw ACS was commanded by a 10 Hz update rate control loop that provided full pitch/yaw control while the vehicle was thrusting. This flight demonstrated that a movable mass pitch/yaw ACS can effectively control the pitch/yaw of small rocket vehicles.

Figure 6:
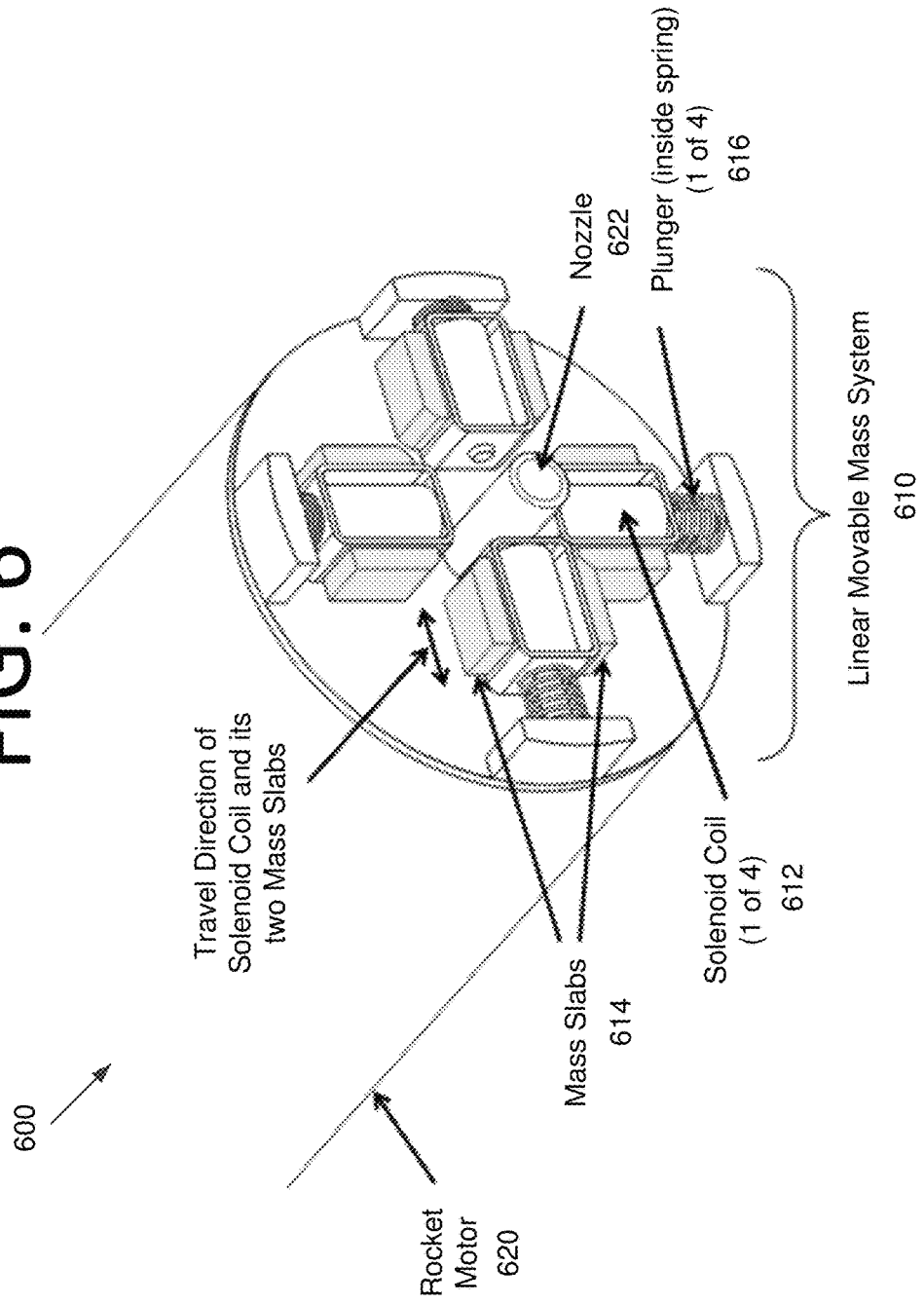
FIG. 6 illustrates a prototype vehicle configured to perform movable mass attitude control using linear actuators within the lateral external envelope of the vehicle, according to an embodiment of the present invention.

FIG. 6 is a solid-model rendering illustrating a prototype vehicle 600 configured to perform movable mass attitude control using linear actuators within the lateral external envelope of vehicle 600, according to an embodiment of the present invention. Exhaust gases exit via nozzle 622. A linear movable mass system 610 is designed for attachment to the bottom of a 5.6 cm diameter rocket motor 620. The hardware shown in this embodiment was designed for test purposes and not for flight.

The movable mass is a solenoid coil 612 with two rectangular mass slabs 614 attached on either side. When solenoid coil 612 is energized, it travels back and forth on its cylindrical shaft or plunger 616, which is attached to rocket motor 620. Mass slabs 614 can be extended in length parallel to the longitudinal axis of the cylinder to increase the amount of mass that is moved.

FIG. 7 is a side cutaway view illustrating a rocket-propelled vehicle 700 where torque is controlled by pumping fluid internally within the vehicle as a movable mass, according to an embodiment of the present invention. Vehicle 700 includes a left tank 710 and a right tank 720 storing respective amounts 712, 722 of fluid. Tanks 710, 720 may be any desired size and in any desired location without deviating from the scope of the invention. The fluid may be water, ethanol, or any other suitable fluid without deviating from the scope of the invention. Having a higher density fluid may be beneficial since less fluid would have to be pumped in order to effectuate flight control. Heating elements (e.g. resistors) 714, 724 may be provided to heat tanks 710, 720, respectively, and prevent the fluid from freezing.

A pump 730 pumps fluid between left tank 710 and right tank 720 via pipe 740. Pump 730 in this embodiment is a two-way pump that can pump fluid from tank 710 to tank 720, and vice versa. A valve 742 prevents the fluid from flowing between tanks 710, 720 when closed. It should be noted that any number and position of pumps, tanks, pipes, and valves may be used without deviating from the scope of the invention.

FIG. 8 is a side cutaway view illustrating a rocket-propelled vehicle 800 where torque is controlled by pumping pressurized gas internally within the vehicle as a movable mass, according to an embodiment of the present invention. Vehicle 800 includes a left tank 810 and a right tank 820 storing respective amounts 812, 822 of gas under pressures P1 and P2, respectively. Tanks 810, 820 may be any desired size and in any desired location without deviating from the scope of the invention. The gas may be any desired gas without deviating from the scope of the invention. However, having a higher density gas may be beneficial since less gas would have to be pumped in order to effectuate flight control.

A pump 830 pumps gas between left tank 810 and right tank 820 via pipe 840. Pump 830 in this embodiment is a two-way pump that can pump gas from tank 810 to tank 820, and vice versa. A valve 842 prevents the gas from flowing between tanks 810, 820 when closed. When it is desired to increase the weight of the opposite tank, valve 842 may be opened until P1 and P2 are roughly equal, and then pump 830 may further pressurize one tank and/or depressurize another tank. It should be noted that any number and position of pumps, tanks, pipes, and valves may be used without deviating from the scope of the invention.

Figure 9A:
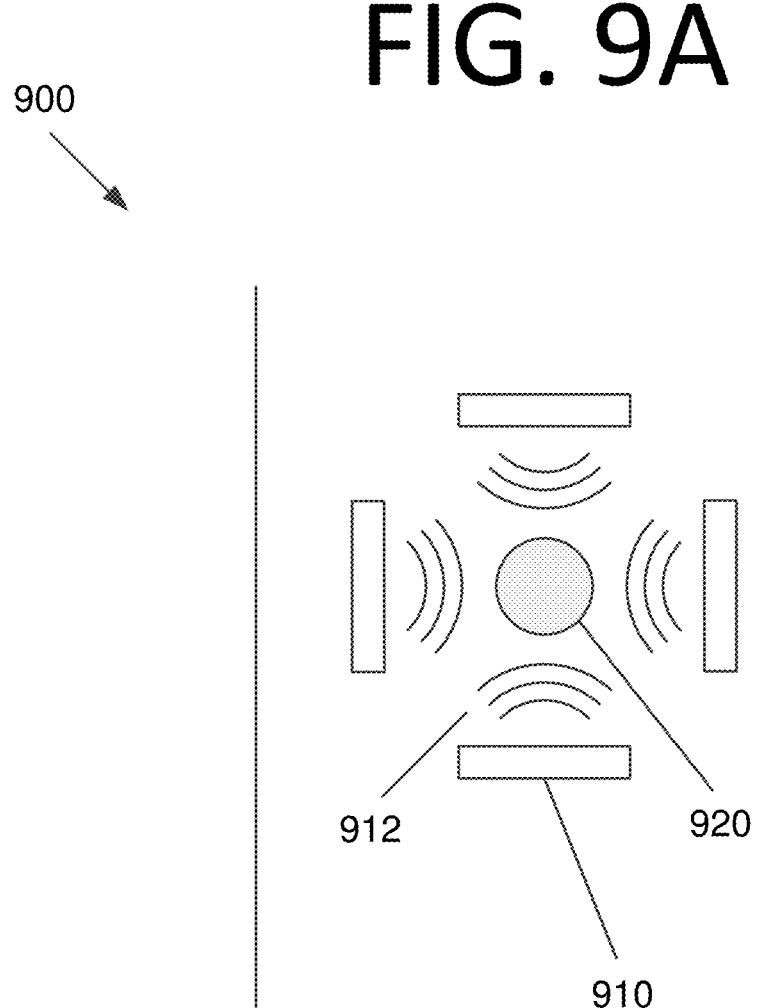
FIG. 9A is a side cutaway view illustrating a movable mass suspended by electromagnetic fields within a vehicle, according to an embodiment of the present invention.

FIG. 9A is a side cutaway view illustrating a movable mass 920 constrained to move in the plane of the page and suspended by electromagnetic fields 912 within a vehicle 900, according to an embodiment of the present invention. In this embodiment, four electromagnets 910 create respective magnetic fields 912 based on the amount of current that is applied to each. Variations in fields 912 cause movable mass 920, which itself is made of magnetic material, to change its position within vehicle 920. This, in turn, sufficiently alters the center-of-mass to effect flight control. It should be appreciated that a one-dimensional design or a three-dimensional design of this concept may also be used in some embodiments. The three-dimensional design may suspend and move the movable mass using only magnetic fields in certain embodiments.

FIG. 9B is a side cutaway view illustrating movable mass 920 suspended by electromagnetic fields movable from inside to outside of vehicle 900, and vice versa, according to an embodiment of the present invention. In this embodiment, vehicle 900 has a tube 930 that may open to allow movable mass to exit vehicle 900. In this embodiment, tube 930 is shown as having a fixed position extending both inside and outside of a skin 902 of vehicle 900. However, in some embodiments, tube 930 may be movable from inside skin 902 of vehicle 900 to outside skin 902 of vehicle 900, and vice versa, via a door or hole (not shown), and may further be controlled to extend outward from skin 902 by a desired length. The dashed lines indicate the positions that movable mass 920 may occupy inside tube 930.

In such embodiments, part or all of movable mass 920 may be a magnet, the magnet having a north pole and a south pole. The poles may be attracted to, or repelled by, either or both of electromagnets 910, causing movement within tube 930, as shown. This attraction/repulsion may be used to suspend movable mass 920 and move it within tube 930.

Alternatively, movable mass 920 may have no poles (i.e., it is not a bipolar magnet, but is nonetheless attracted to and repulsed by magnetic fields), but electromagnets 910 may rapidly switch their fields so as to rapidly attract/repulse movable mass 920 and maintain a desired position, and/or may modify the strength of their fields to maintain or change the positon of movable mass 920. Moving movable mass 920 within tube 930 may effectuate greater torque than is possible using movable mass 920 with internal embodiments alone. However, given atmospheric drag, in some embodiments, it may not be possible to deploy tube 930 outside of vehicle 900 until vehicle 900 leaves the atmosphere, or reaches an altitude where the atmosphere is sufficiently thin.

Figure 10:
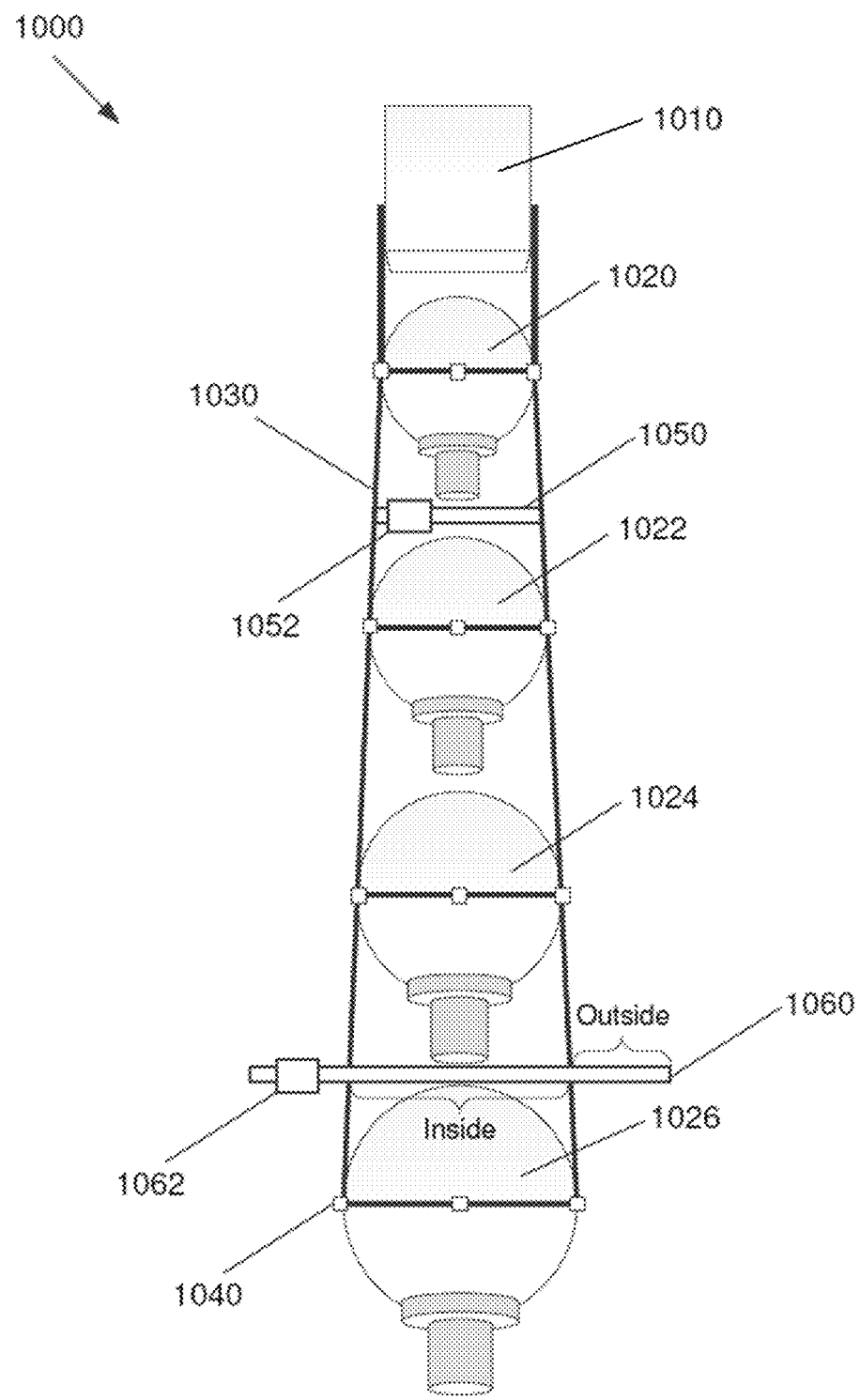
FIG. 10 is a side view of an open framed space vehicle, according to an embodiment of the present invention.

FIG. 10 is a side view of an open framed space vehicle 1000, according to an embodiment of the present invention. Open framed space vehicle 1000 includes a payload 1010 (e.g., a cubesat or any other desired payload) and four spherical rocket motors 1020, 1022, 1024, 1026 that are collectively held in place by a frame 1030. Attachment members 1040 hold respective rocket motors 1020, 1022, 1024, 1026 in place. Attachment members may be any suitable mechanism for attaching rocket motors 1020, 1022, 1024, 1026 to, and releasing them from, frame 1030. For instance, attachment members 1040 may be mechanical, electromechanical, or magnetic grips, soldered connections that are severed by an explosive charge or plasma, or any other desired mechanism for holding rocket motors 1020, 1022, 1024, 1026 in place. Payload 1010 may also have attachment members (not shown) to connect payload 1010 to/release it from frame 1030.

Space vehicle 1000 is a staged rocket in this embodiment. In other words, rocket motors 1026, 1024, 1022, 1020 are fired in succession. Rocket motor 1026 would be fired first. Once exhausted, rocket motor 1026 would be released from frame 1030 by respective attachment members 1040. Rocket motor 1024 would then fire, and this process would be repeated until all rocket motors are successively spent and released.

In this embodiment, space vehicle 1000 includes multiple movable mass assemblies 1050, 1060 that include respective movable masses 1052, 1062. In this embodiment, movable mass assemblies 1050, 1060 are rails, and movable masses 1052, 1062 include motors that move movable masses 1052, 1062 along the rails. However, any suitable movable mass mechanism or combination of mechanisms, such as those shown in FIGS. 1 and 2, may be used without deviating from the scope of the invention. Rail 1050 extends within the boundaries of frame 1030, and rail 1060 extends beyond the boundaries of frame 1030.

In the embodiment shown in FIG. 10, there is no skin surrounding and housing the components of space vehicle 1000. Rather, frame 1030, which is a truss structure in this embodiment, is mostly open, and the components are exposed to space. As such, the movement of movable masses 1052, 1062 may be viewed with respect to the "outline" of space vehicle 1000 as defined on the left and right sides by frame 1030. For instance, the portion of rail 1060 that is denoted "inside" is considered within space vehicle 1000 and the portion of rail 1060 denoted "outside" is considered outside of space vehicle 1000. Thus, movable mass 1062 can move outside the outline of space vehicle 1000, as is shown in FIG. 10. While horizontal extension outside of space vehicle 1000 is shown in this embodiment, movable masses may extend in any direction from a vehicle in other embodiments without deviating from the scope of the invention.

Figure 11:
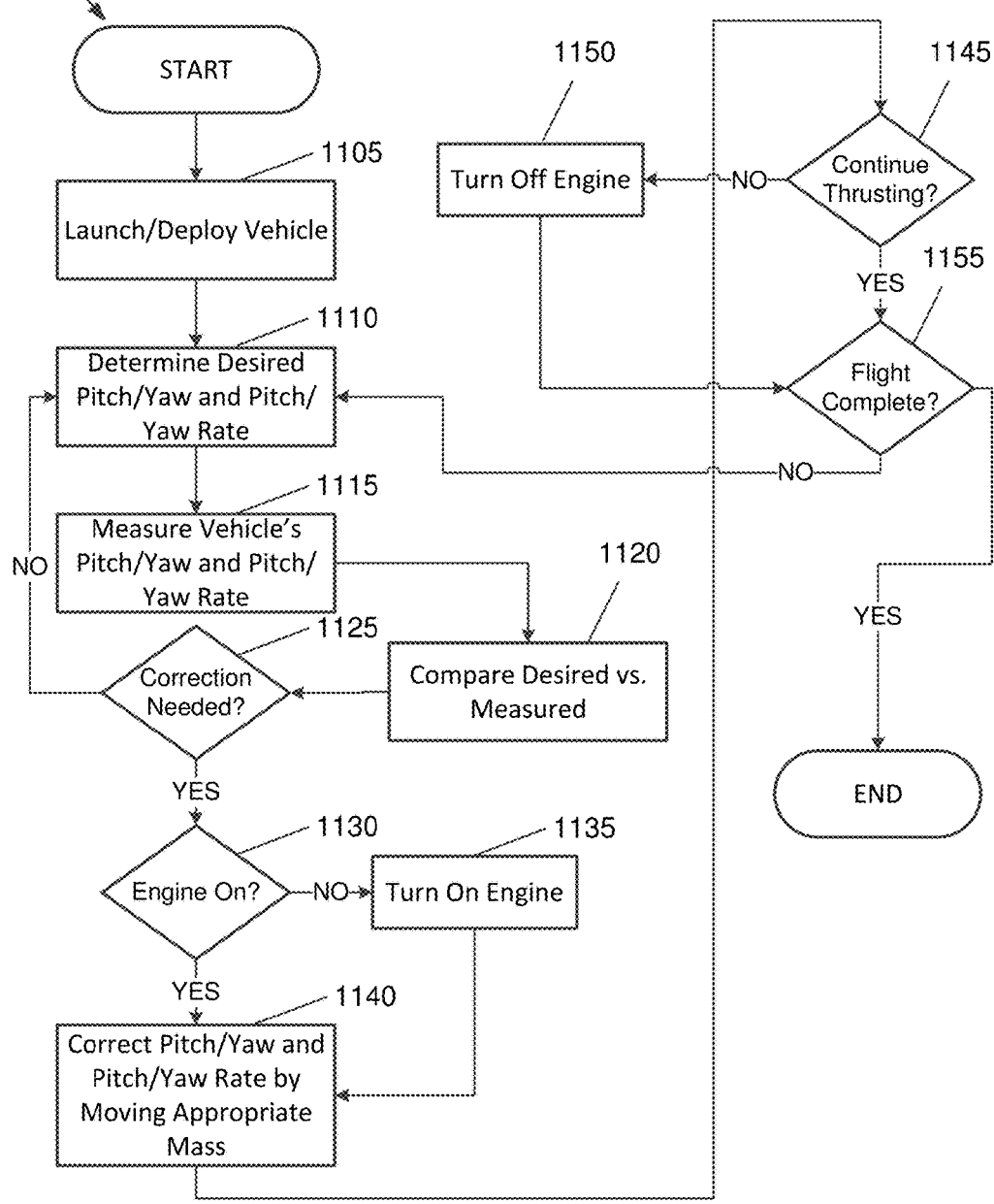
FIG. 11 is a flowchart illustrating a process for performing pitch/yaw and/or pitch/yaw rate control, and compensation for thrust misalignment, using a movable mass ACS, according to an embodiment of the present invention.

FIG. 11 is a flowchart 1100 illustrating a process for performing pitch/yaw and/or pitch/yaw rate control, and compensation for thrust misalignment, using a movable mass ACS, according to an embodiment of the present invention. A movable mass TVC system is configured for a vehicle with an ACS and an engine producing thrust for propelling the vehicle. The thrust acts along the nominal roll axis and is the only external applied force acting on the vehicle for this embodiment. In certain embodiments, a second force in addition to thrust that is non-parallel with the roll axis may be present and used for performing roll and/or roll rate control, making available full attitude and attitude rate control. This second force may typically be the sum of lift and/or drag forces. In some embodiments, attitude and/or attitude rate control using force vector control may be performed by computing system 1200 of FIG. 12 controlling actuators for one or more movable masses.

The process begins with launching/deploying the vehicle at 1105 by activating the engine or other propulsion approach, such as a catapult, electromagnetic launcher or rail gun, detaching the vehicle from another flying vehicle, or any other desired approach, such that the vehicle is in flight. The desired pitch/yaw and pitch/yaw rate are determined at 1110 and the vehicle's pitch/yaw and pitch/yaw rate are measured at 1115. The system then compares the desired pitch/yaw and pitch/yaw rate to the measured pitch/yaw and pitch/yaw rate at 1120. If the current (measured) pitch/yaw and/or pitch/yaw rate do not need to be changed at 1125, the process returns to step 1110.

However, if correction is needed at 1125, the system checks whether the engine is on at 1130. If the engine is not on at 1130, the engine is turned on at 1135, and the process proceeds to step 1140. If the engine is already on at 1130, the process proceeds to step 1140.

At 1040, the appropriate movable masses are moved to correct the pitch/yaw and/or pitch/yaw rate. If the engine should not continue thrusting at 1145, the engine is turned off at 1150. If the flight is not complete at 1155, the process returns to step 1110. Otherwise, the process ends.

The forces on the vehicle, how far each movable mass is moved, and which movable masses are moved, will control both the type of rotation that the vehicle experiences and the amount of rotation. Multiple types of control may be applied at the same time in some embodiments. It should be noted that one or more of the same movable masses may have to be moved to a different position to perform simultaneous control of pitch and yaw than would be needed to control only one of these rotations. The system accounts for this during its calculations.

Figure 12:
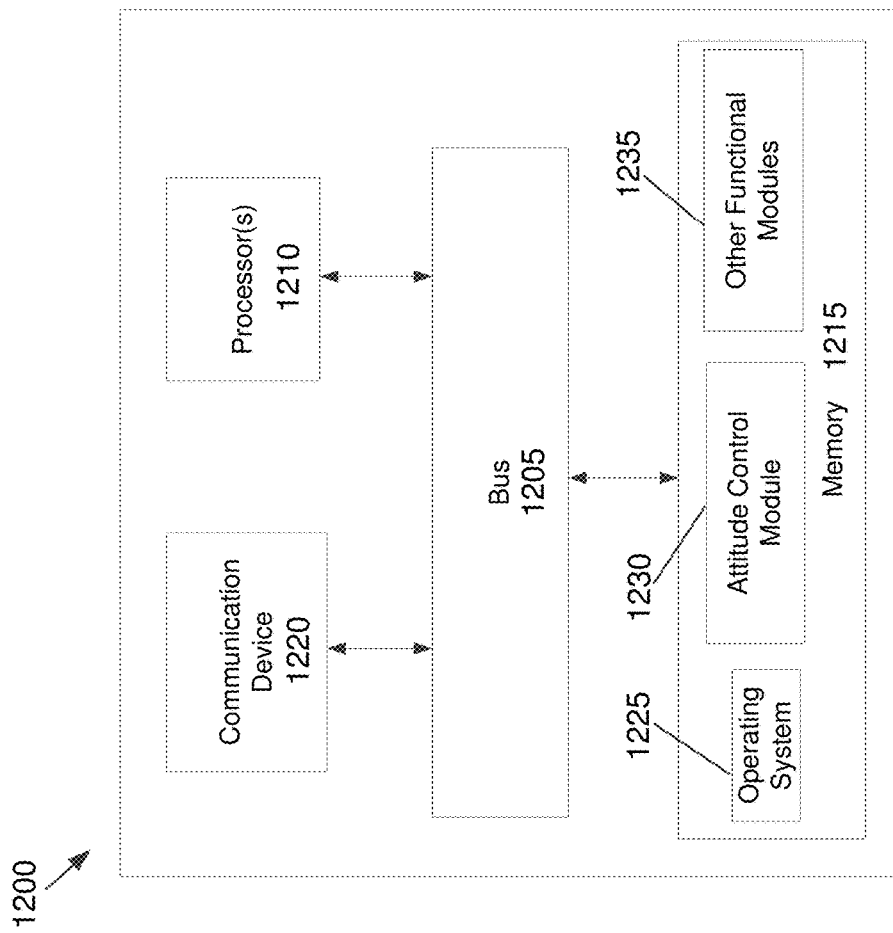
FIG. 12 is a block diagram of a computing system configured to control attitude and/or attitude rate of a vehicle using movable masses, according to an embodiment of the present invention.

FIG. 12 is a block diagram 1200 of a computing system (hereinafter "system") configured to control attitude and/or attitude rate of a vehicle using movable masses, according to an embodiment of the present invention. System 1200 may control the position of movable masses via actuators, solenoids, or any other suitable mechanism that drives the movement thereof. System 1200 includes a bus 1205 or other communication mechanism for communicating information, and processor(s) 1210 coupled to bus 1205 for processing information. Processor(s) 1210 may be any type of general or specific purpose processor, including a central processing unit (CPU) or application specific integrated circuit (ASIC). System 1200 further includes a memory 1215 for storing information and instructions to be executed by processor(s) 1210. Memory 1215 can be comprised of any combination of random access memory ("RAM"), read only memory ("ROM"), flash memory, cache, static storage such as a magnetic or optical disk, or any other types of non-transitory computer-readable media or combinations thereof. Additionally, system 1200 includes a communication device 1220, such as a transceiver, to wirelessly communicate with external systems.

Non-transitory computer-readable media may be any available media that can be accessed by processor(s) 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 1215 stores software modules that provide functionality when executed by processor(s) 1210. The modules include an operating system 1225 for system 1200. The modules further include an attitude control module 1230 that is configured to control the attitude and/or attitude rate of the vehicle using movable masses. For instance, attitude control module 1230 may be configured to perform any of the attitude and/or attitude rate control operations discussed herein. System 1200 may include one or more additional functional modules 1235 that include additional functionality.

One skilled in the art will appreciate that a "system" could be embodied as a computer, a server, a console, or any other suitable computing device, or combination of devices. However, in many embodiments, system 1100 will be implemented as electronics and software of an ACS, a reaction control system (RCS), and/or a flight control system (FCS) for a flying vehicle. Furthermore, in certain embodiments, separate systems may control attitude and flight path. Any suitable control system or combination of systems, whether electronic, mechanical, or both, may be used as a matter of design choice. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 13:
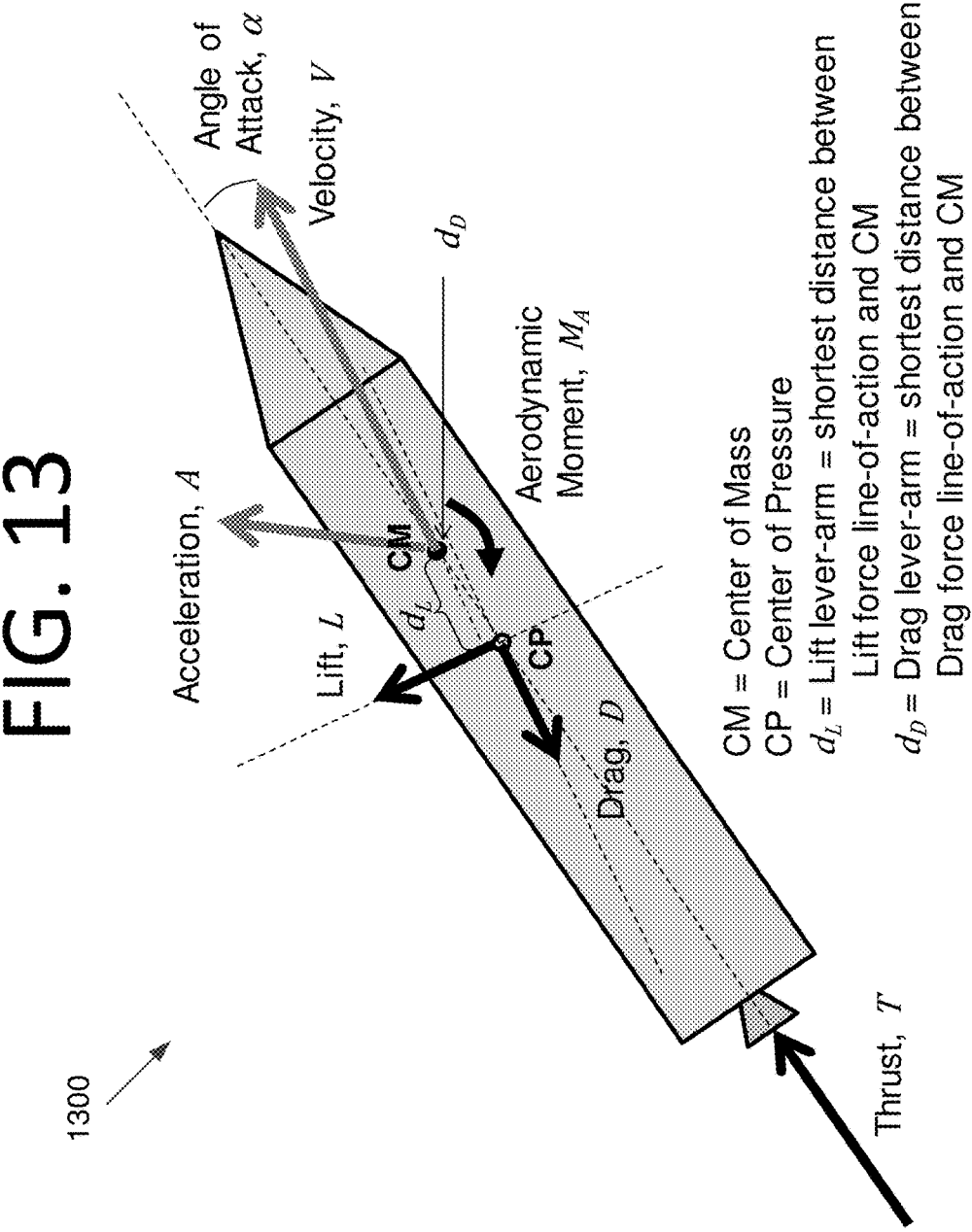
FIG. 13 is a conceptual diagram illustrating lines of action of a vehicle, according to an embodiment of the present invention.

FIG. 13 illustrates lines of action of a vehicle 1300, according to an embodiment of the present invention. More specifically, FIG. 13 illustrates the basic forces and motion variables of a finless, thrusting rocket or missile traveling through the atmosphere. Three forces are at play-thrust, drag, and lift. The gravity force is omitted for simplicity. Thrust is produced by the rocket motor and is generally directed along the longitudinal axis of the rocket. Thrust is physically applied at the nozzle of the rocket motor. Lift and drag are due to air flow over the rocket and are applied at the center-of-pressure (CP) of the rocket. By definition, the drag force is parallel to the velocity vector and the lift force is orthogonal to the velocity vector.

The line-of-action of a force is a line through its point of application in the same direction as the force. The dotted lines in the figure illustrate the lines-of-action of the thrust, lift, and drag forces. When the line-of-action of a force does not pass through the center-of-mass (CM) of a rocket, a moment (or torque) is created about the CM of the rocket, which will cause the rocket to rotate about its CM. The moment is simply the product of the force and its "lever arm," which is the shortest distance between the line of action and the CM. For example, the magnitude of the aerodynamic moment in FIG. 13 is given by $M_A = Ld_L + Dd_D$.

The rotational motion of the rocket can be controlled by controlling the location of its CM. For example, suppose the CM is moved to the CP. Now all three forces pass through the CM and the aerodynamic moment disappears.

Consider another location for the CM. Suppose the CM is moved perpendicular to the line-of-action of the thrust in the down direction of the figure. This will do two things: (1) it will alter the aerodynamic moment; and (2) it will create a moment due to the thrust. The moment due to the thrust will be in the opposite direction of the aerodynamic moment. By moving the CM the proper amount, the thrust moment and aerodynamic moment can be made to cancel, resulting in no net moment acting on the rocket. Both of these examples illustrate how a moving-mass control system designed to relocate the CM of a rocket can control the rotational motion of the rocket, and thereby provide attitude control.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A vehicle attitude control system for controlling attitude and/or attitude rate of a vehicle subject to applied forces whose lines of action intersect within the vehicle or within an outline of the vehicle, comprising:
   one or more movable masses configured to move a center-of-mass of the vehicle; and
   a computing system configured to:
      periodically or continuously calculate an attitude and attitude rate of the vehicle, and
      when the attitude and/or attitude rate are not at desired values, perform an attitude and/or attitude rate correction by moving at least one of the one or more movable masses to achieve the desired values based on the calculated attitude and attitude rate to counteract a current angular acceleration and return the vehicle to a desired attitude and/or attitude rate, wherein
   the one or more movable masses are external to the vehicle or the outline of the vehicle.

2. The vehicle attitude control system of claim 1, wherein at least one of the one or more movable masses is internal to the vehicle or the outline of the vehicle.

3. A vehicle attitude control system for controlling attitude and/or attitude rate of a vehicle subject to applied forces whose lines of action intersect within the vehicle or within an outline of the vehicle, comprising:
   one or more movable masses configured to move a center-of-mass of the vehicle; and a computing system configured to:
   periodically or continuously calculate an attitude and attitude rate of the vehicle, and
   when the attitude and/or attitude rate are not at desired values, perform an attitude and/or attitude rate correction by moving at least one of the one or more movable masses to achieve the desired values based on the calculated attitude and attitude rate to counteract a current angular acceleration and return the vehicle to a desired attitude and/or attitude rate of, wherein
   at least one of the one or more movable masses is attached proximate to an exhaust nozzle of a rocket motor or engine; wherein the one or more movable masses are external to the vehicle or the outline of the vehicle.

4. A vehicle attitude control system for controlling attitude and/or attitude rate of a vehicle subject to applied forces whose lines of action intersect within the vehicle or within an outline of the vehicle, comprising:
   one or more movable masses configured to move a center-of-mass of the vehicle; and
   a computing system configured to:
      periodically or continuously calculate an attitude and attitude rate of the vehicle, and
      when the attitude and/or attitude rate are not at desired values, perform an attitude and/or attitude rate correction by moving at least one of the one or more movable masses to achieve the desired values based on the calculated attitude and attitude rate to counteract a current angular acceleration and return the vehicle to a desired attitude and/or attitude rate, wherein
   at least one of the one or more movable masses extends partially or fully outward from the vehicle or the outline of the vehicle.

5. A vehicle attitude control system for controlling attitude and/or attitude rate of a vehicle subject to applied forces whose lines of action intersect within the vehicle or within an outline of the vehicle, comprising:
   one or more movable masses configured to move a center-of-mass of the vehicle; and
   a computing system configured to:
      periodically or continuously calculate an attitude and attitude rate of the vehicle, and
      when the attitude and/or attitude rate are not at desired values, perform an attitude and/or attitude rate correction by moving at least one of the one or more movable masses to achieve the desired values based on the calculated attitude and attitude rate to counteract a current angular acceleration and return the vehicle to a desired attitude and/or attitude rate, wherein
   at least one movable mass is internal to the vehicle or the outline of the vehicle and at least one movable mass is partially or fully external to the vehicle or the outline of the vehicle.

6. A vehicle attitude control system for controlling attitude and/or attitude rate of a vehicle subject to applied forces whose lines of action intersect within the vehicle or within an outline of the vehicle, comprising:
    one or more movable masses configured to move a center-of-mass of the vehicle; and
    a computing system configured to:
        periodically or continuously calculate an attitude and attitude rate of the vehicle, and
        when the attitude and/or attitude rate are not at desired values, perform an attitude and/or attitude rate correction by moving at least one of the one or more movable masses to achieve the desired values based on the calculated attitude and attitude rate to counteract a current angular acceleration and return the vehicle to a desired attitude and/or attitude rate, wherein
    at least one movable mass is configured to be moved from an inside of the vehicle or the outline of the vehicle to partially or fully outside of the vehicle or the outline of the vehicle, and vice versa, via an opening in an exterior or the outline of the vehicle.

7. The vehicle attitude control system of claim 1, wherein when the vehicle is not rotating and is then subject to a thrust misalignment that causes the vehicle to begin rotating, the attitude and attitude rate correction comprises:
    moving at least one of the one or more movable masses to cause an opposite angular acceleration to an initial angular acceleration such that rotation of the vehicle slows and stops, and the vehicle then begins to rotate back in an opposite direction,
    moving at least one of the one or more movable masses to slow the rotation of the vehicle in the opposite direction such that the rotation in the opposite direction stops, and
    moving at least one of the one or more movable masses such that a center of mass of the vehicle intersects a line of action of thrust of the vehicle.

8. The vehicle attitude control system of claim 3, wherein when the vehicle is not rotating and is then subject to a thrust misalignment that causes the vehicle to begin rotating, the attitude and attitude rate correction comprises:
    moving at least one of the one or more movable masses to cause an opposite angular acceleration to an initial angular acceleration such that rotation of the vehicle slows and stops, and the vehicle then begins to rotate back in an opposite direction,
    moving at least one of the one or more movable masses to slow the rotation of the vehicle in the opposite direction such that the rotation in the opposite direction stops, and
    moving at least one of the one or more movable masses such that a center of mass of the vehicle intersects a line of action of thrust of the vehicle.

9. The vehicle attitude control system of claim 4, wherein when the vehicle is not rotating and is then subject to a thrust misalignment that causes the vehicle to begin rotating, the attitude and attitude rate correction comprises:
    moving at least one of the one or more movable masses to cause an opposite angular acceleration to an initial angular acceleration such that rotation of the vehicle slows and stops, and the vehicle then begins to rotate back in an opposite direction,
    moving at least one of the one or more movable masses to slow the rotation of the vehicle in the opposite direction such that the rotation in the opposite direction stops, and
    moving at least one of the one or more movable masses such that a center of mass of the vehicle intersects a line of action of thrust of the vehicle.

10. The vehicle attitude control system of claim 5, wherein when the vehicle is not rotating and is then subject to a thrust misalignment that causes the vehicle to begin rotating, the attitude and attitude rate correction comprises:
    moving at least one of the one or more movable masses to cause an opposite angular acceleration to an initial angular acceleration such that rotation of the vehicle slows and stops, and the vehicle then begins to rotate back in an opposite direction,
    moving at least one of the one or more movable masses to slow the rotation of the vehicle in the opposite direction such that the rotation in the opposite direction stops, and
    moving at least one of the one or more movable masses such that a center of mass of the vehicle intersects a line of action of thrust of the vehicle.

11. The vehicle attitude control system of claim 6, wherein when the vehicle is not rotating and is then subject to a thrust misalignment that causes the vehicle to begin rotating, the attitude and attitude rate correction comprises:
    moving at least one of the one or more movable masses to cause an opposite angular acceleration to an initial angular acceleration such that rotation of the vehicle slows and stops, and the vehicle then begins to rotate back in an opposite direction,
    moving at least one of the one or more movable masses to slow the rotation of the vehicle in the opposite direction such that the rotation in the opposite direction stops, and
    moving at least one of the one or more movable masses such that a center of mass of the vehicle intersects a line of action of thrust of the vehicle.

12. The vehicle attitude control system of claim 3, wherein at least one of the one or more movable masses is internal to the vehicle or the outline of the vehicle.

13. The vehicle attitude control system of claim 4, wherein at least one of the one or more movable masses is internal to the vehicle or the outline of the vehicle.

14. The vehicle attitude control system of claim 5, wherein at least one of the one or more movable masses is internal to the vehicle or the outline of the vehicle.

15. The vehicle attitude control system of claim 6, wherein at least one of the one or more movable masses is internal to the vehicle or the outline of the vehicle.

* * * * *